Figure 1:
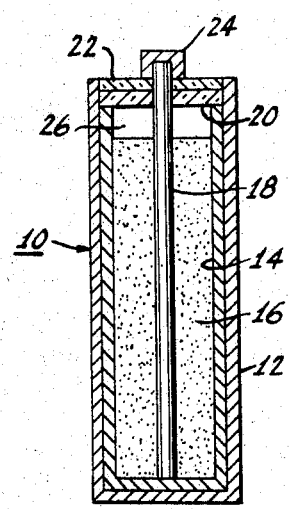

March 31, 1959  C. K. MOREHOUSE ET AL  2,880,122
PRIMARY CELLS

Filed June 13, 1956  3 Sheets-Sheet 1

INVENTORS
RICHARD GLICKSMAN &
CLARENCE K. MOREHOUSE
BY
J. L. Whittaker
ATTORNEY

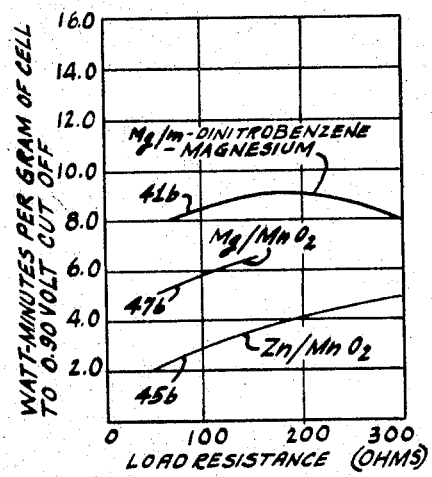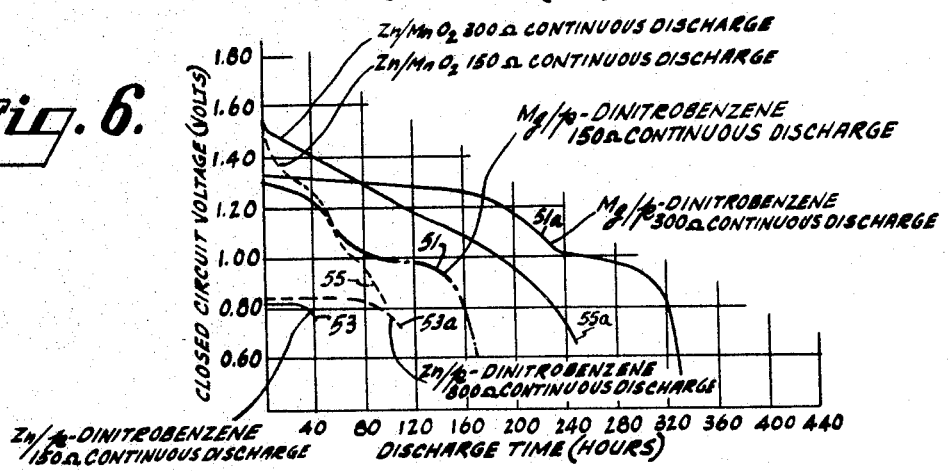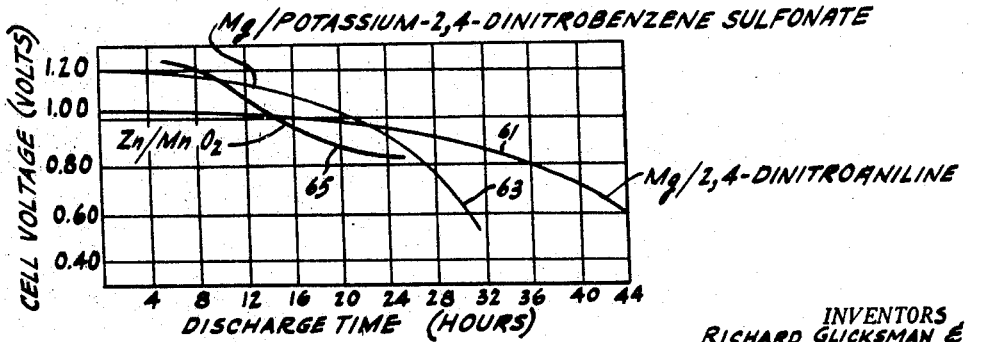

United States Patent Office 2,880,122
Patented Mar. 31, 1959

2,880,122
PRIMARY CELLS

Clarence K. Morehouse, Princeton, and Richard Glicksman, Highland Park, N.J., assignors to Radio Corporation of America, a corporation of Delaware Application June 13, 1956, Serial No. 591,050

15 Claims. (Cl. 136—137)

This is a continuation-in-part of U.S. patent application S.N. 444,178, filed July 19, 1954, and now abandoned, by C. K. Morehouse and R. Glicksman.

This invention relates to primary cells, and particularly, but not necessarily exclusively, to improved primary cells including a magnesium anode and a cathode comprising a nitro-organic compound.

Primary cells are electrochemical devices from which stored chemical energy is converted directly into electrical energy by an electrochemical process. Generally, the term primary cells refers to a class of cells that do not have efficiently reversible chemical reactions. Once the chemical energy is converted to electrical energy, the cells are discarded. Primary cells that are manufactured to include a non-spillable electrolyte are referred to as dry cells. Primary cells that are assembled without one of the essential components, such as the electrolyte, but are adapted to supply electrical energy when the component is added just prior to use, are referred to as reserve cells.

A primary cell which is to be used as a portable power supply should have the following characteristics: a high watt-hour and a high ampere-hour capacity per unit of volume or weight, a high flat operating voltage over a wide range of current drains, a long life, and a low cost.

One problem in present day primary cells is that they include materials which come into short supply in times of emergency because the materials become critical to the interests of the United States as a whole. These materials may become critical because they are supplied from foreign sources, or because domestic ore sources are limited in size and mining capacity, or for some other economic reason.

Accordingly, an object of this invention is to provide primary cells which are comparatively inexpensive to manufacture, have a high watt-hour and a high ampere-hour capacity per unit of volume or weight, and have a relatively high flat operating voltage level over a wide range of current drains.

A further object is to provide an improved electrochemical system which may be employed in primary cells.

Another object is to provide improved primary cells including materials which are non-strategic, can be readily available in large quantities in the United States, and are comparatively inexpensive.

In general, the foregoing objects are accomplished in the improved primary cells of the invention which include an anode selected from the group consisting of magnesium and magnesium base alloys and a cathode including an organic oxidizing substance in which the oxidizing properties are due at least in part to nitro groups chemically combined in said substance. The invention includes reserve cells including the above-described combination and adapted to be used to supply electrical energy upon the addition of an electrolyte.

Figure 2:
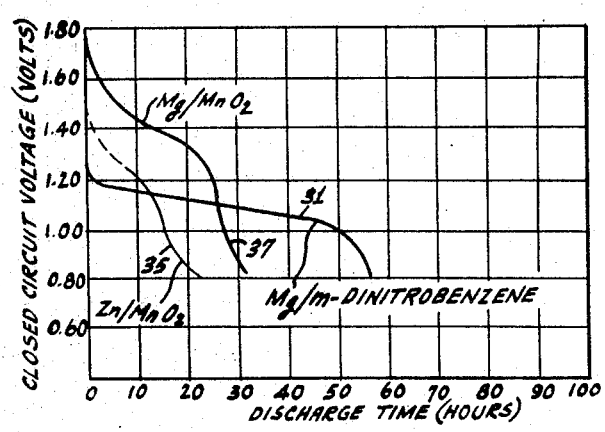

The invention is described in greater detail by reference to the drawings wherein:

Figure 1 is a sectional, elevational view of a typical dry cell of the invention, Figure 2 is a family of curves showing the change in cell voltage with respect to discharge time of an "AA" size dry cell of the invention compared with dry cells of comparable size from other electrochemical systems when discharged continuously through a 50 ohm resistance.

Figure 4:
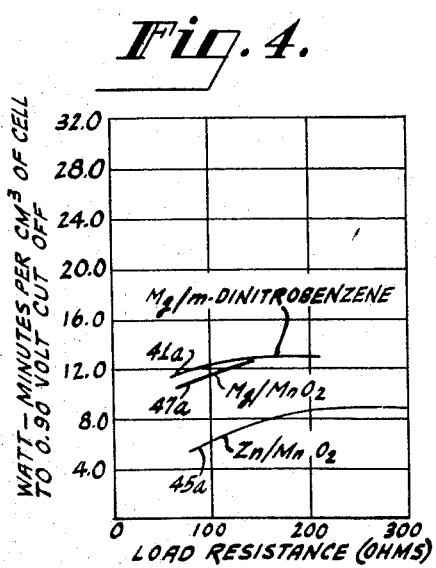
Figure 3:
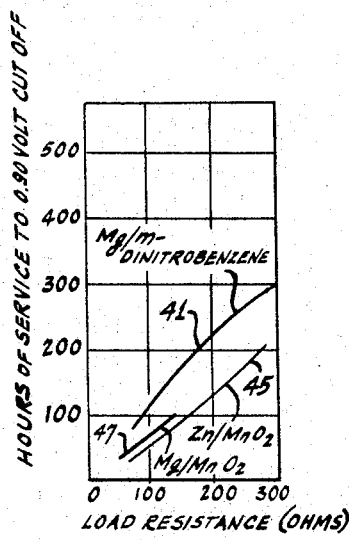
Figure 8:
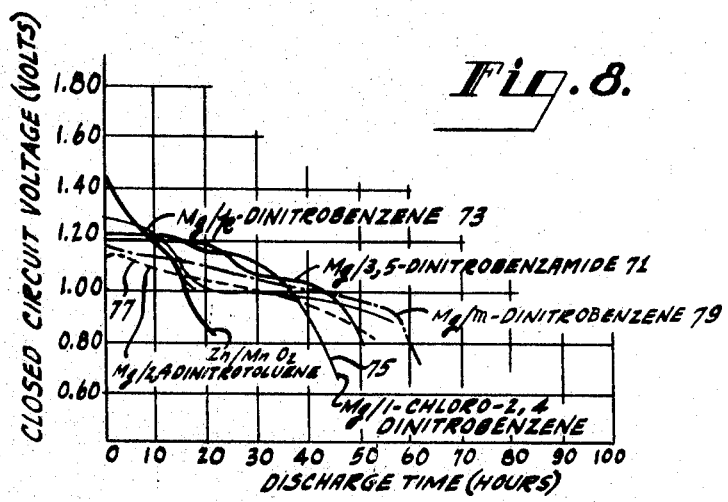
Figure 9:
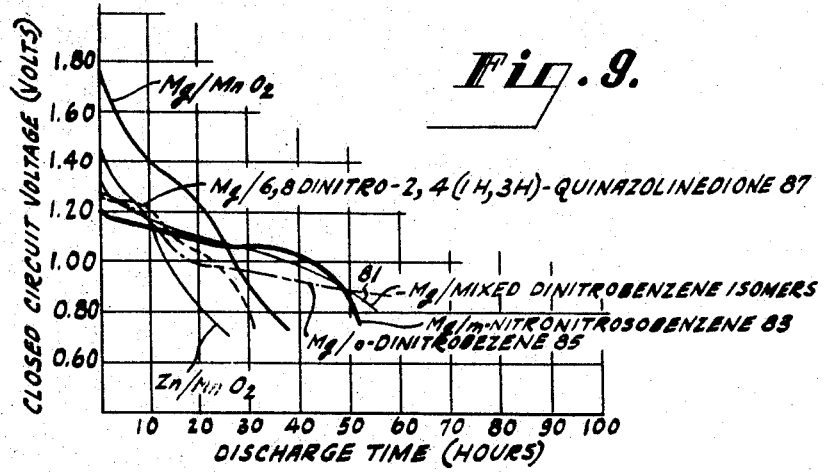

Figure 3 is a family of curves illustrating the service life to a 0.9 volt cutoff of various "AA" size dry cells of Figure 2 under various discharge rates, Figure 4 is a family of curves illustrating the power supplied per unit volume to a 0.90 volt cutoff of the cells of Figure 2 under various discharge rates, Figure 5 is a family of curves illustrating the power supplied per unit weight to a 0.90 volt cutoff of the dry cells of Figure 2 under various discharge rates, Figure 6 is a family of curves illustrating the discharge characteristics of a primary cell of the invention under various discharge rates compared with primary cells from other electrochemical systems, Figure 7 is a group of curves illustrating the discharge characteristics of several dry cells of the invention, Figure 8 is a group of curves illustrating the discharge characteristics of several dry cells of the invention, and Figure 9 is a group of curves illustrating the discharge characteristics of several dry cells of the invention.

Example 1.—Referring to Figure 1, a dry cell 10 of conventional design may be prepared as follows: a metallic anode 12 is provided in the form of a cup of the standard "AA" size (American Standards Association, Bureau of Standards, Washington, D.C.). The anode 12 has the approximate composition 98.4% magnesium, 1.0% aluminum, 0.5% zinc and 0.10% calcium. This alloy composition is sometimes designated AZ10A. The anode 12 is lined with a separator 14 comprising an absorbent kraft paper. The separator 14 keeps the anode 12 and a cathode 16 apart while providing therebetween a low resistance path to the flow of ions during the electrochemical process.

A mix including the cathode material and electrolyte, hereinafter referred to as the cathode mix, is prepared of the following constituents:

6.7 grams m-dinitrobenzene
13.4 grams Darco G60 carbon black (marketed by the Atlas Powder Co., Wilmington, Delaware)
1.0 gram barium chromate
32 ml. aqueous solution containing 500 grams of $MgBr_2 \cdot 6H_2O$ and 1.0 gram of $Li_2CrO_4 \cdot 2H_2O$ per liter of water Approximately 5 grams of the cathode mix is formed to a cylindrical slug and inserted into the paper lined anode 12 to form a cathode 16. A carbon rod 18 is inserted into the mix 16 to provide electrical connection thereto. The anode 12 is sealed by an insulating washer 20 mounted on the carbon rod and a layer 22 of hard wax on the washer. A metal contact cap 24 of brass is placed on rod 18. An air space 26 is provided between the washer 20 and the cathode 16.

The anode and cathode may now be connected through an external load whereby the cell commences to be discharged by electrochemical action. The cell reactions are believed to occur as follows:

Anode reaction
$$6Mg \rightarrow 6Mg^{++} + 12e^-$$

Cathode reaction

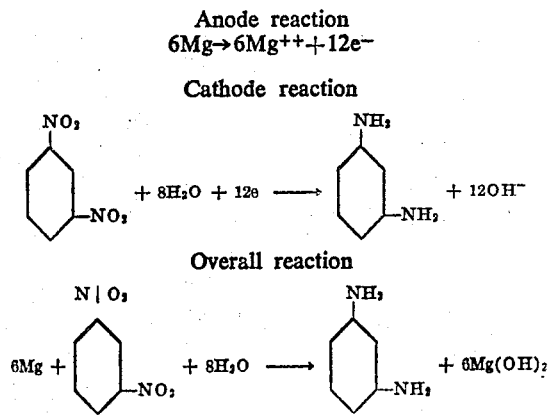

Overall reaction

Figure 2 shows characteristic initial discharge curves for "AA" size dry cells discharged continuously through a 50 ohm load resistance (simulating the current drain requirements of a transistor operated portable radio). Curve 31 shows the characteristic discharge curve for the cell of Example 1 containing m-dinitrobenzene as the cathode material and magnesium anode (magnesium/m-dinitrobenzene). For comparison, curve 35 shows the characteristic discharge curve for a similar commercially-available zinc/manganese dioxide cell discharged under similar conditions. Curve 37 shows the characteristic discharge curve for a similar magnesium/manganese dioxide cell discharged under similar conditions. The dry cell of Example 1 exhibits a high flat voltage curve resulting in more uniform performance of the equipment which is supplied with electric power. Also, the dry cell of Example 1 supplies power for a longer period to a 0.9 volt cutoff. This cutoff voltage represents the practical voltage below which portable electronic equipment ordinarily becomes inoperative.

Figure 3 compares the dry cells of Figure 2 for hours of service to a 0.90 volt cutoff for various load resistances as follows: curve 41, magnesium/m-dinitrobenzene; curve 45, zinc/manganese dioxide; and curve 47, magnesium/manganese dioxide. The dry cell of Example 1 provides more hours of service than any of the other cells over the entire range.

Figure 4 compares the dry cells of Figure 2 for watt-minutes per cubic centimeter to a 0.90 volt cutoff for various load resistances. The dry cell of Example 1 provides more power per unit volume than any of the other cells over the entire range.

Figure 5 compares the dry cells of Figure 2 for watt-minutes per gram of cell to a 0.90 volt cutoff for various load resistances. The dry cell of Example 1 provides more total power per unit weight than any of the other cells over the entire range.

Figures 2 to 5 show that the dry cell of Example 1 is lighter and provides a more uniform voltage over a longer period of time than prior cells. The practical advantage is that portable electronic equipment may be operated more uniformly over longer periods of time with such dry cells. In missiles for military use, where weight and size is an important factor, the dry cell of Example 1 is lighter and lasts longer than prior dry cells at a similar power output.

In addition to its favorable performance, the dry cell of Example 1 has the great advantage that it employs non-strategic, plentiful materials which are relatively easy to manufacture in the United States, and when manufactured in large quantities, should be relatively inexpensive. Magnesium may be obtained from sea water and the m-dinitrobenzene may be produced synthetically.

The primary cells of the invention comprise generally the following parts:

(1) An anode selected from the group of materials consisting of magnesium and magnesium-base alloys, (2) An electrolyte which may include (a) a soluble substance for increasing the electrical-conductivity thereof and (b) a material for inhibiting the corrosion of the anode, (3) A cathode including a depolarizer consisting of an organic oxidizing substance in which the oxidizing properties thereof are due at least in part to chemically combined nitro groups. The cathode may include also an inorganic depolarizer, other organic depolarizer and/or an inorganic material for increasing the conductivity of the cathode.

*The anode.*—The anode for the primary cells of the invention may be magnesium or magnesium-base alloys. The term "magnesium anode" includes both magnesium and magnesium-base alloy anodes. A magnesium-base alloy is one wherein the predominant ingredient is magnesium. Thus, any alloy having more than 50% magnesium is satisfactory. It is preferred, however, to have as high a proportion of magnesium as possible. Other ingredients are added to magnesium to improve the properties of the anode for fabrication purposes, to impart a greater degree of corrosion resistance, or for other reasons. Table I sets forth examples of magnesium-base alloys which are suitable for anode material together with the corresponding ASTM designations.

TABLE I

*Anode compositions*

| Alloy No. | A.S.T.M. Designation | Nominal Composition [1] | | | | | |
|---|---|---|---|---|---|---|---|
| | | Al | Mn | Zn | Zr | Ce | Ca |
| 1 | A3 | 3.0 | 0.2 | | | | |
| 2 | A4 | 4.0 | 0.2 | | | | |
| 3 | A8 | 8.0 | 0.1 | | | | |
| 4 | A10 | 10.0 | 0.1 | | | | |
| 5 | A12 | 12.0 | 0.1 | | | | |
| 5a | AZ10A | 1.0 | | 0.5 | | | 0.10 |
| 6 | AZ31 | 2.8 | 0.3 | 1.0 | | | |
| 6a | AZ31X | 3.0 | 0.2 | 1.0 | | | 0.15 |
| 7 | AZ33 | 3.0 | 0.2 | 3.0 | | | |
| 8 | AZ61 | 6.5 | 0.2 | 0.7 | | | |
| 9 | AZ63 | 6.0 | 0.2 | 3.0 | | | |
| 10 | AZ81 | 8.5 | 0.2 | 0.5 | | | |
| 11 | AZ91 | 9.0 | 0.2 | 0.6 | | | |
| 12 | AZ92 | 0.9 | 0.1 | 2.0 | | | |
| 13 | E6 | | | | | 6.0 | |
| 14 | EM42 | | 2.0 | | | 4.0 | |
| 15 | EM62 | | 2.0 | | | 6.0 | |
| 16 | M1 | | 1.5 | | | | |
| 17 | M2 | | 2.0 | | | | |
| 18 | ZK30 | | | 3.0 | 0.7 | | |
| 19 | ZK60 | | | 6.0 | 0.7 | | |
| 20 | Z1 | | | 1.0 | | | |

[1] Balance commercial magnesium.

The magnesium anode may be the container for the cell, may be the lining of the container, or may be a separate structure inserted in the container. The magnesium anode may be in any geometrical configuration desired.

It is necessary to space the cathode and anode from one another. To accomplish this, it is preferred to insert a separator between the anode and the cathode regardless of configuration, although other methods of spacing may be used. The separator may be any porous material such as kraft paper, kraft paper treated with a gel-like material such as carboxymethylcellulose, polyvinyl alcohol, or a starch-flour gel. The coating on the kraft paper promotes adhesion of the paper to the anode and maintains good electrical contact between the electrolyte and the anode. Porous ceramics or other inorganic or organic structures may be used in place of paper.

*The electrolyte.*—The electrolyte may be an aqueous solution containing a soluble salt such as sea water, or water to which one or more soluble salts have been deliberately added. Bromides of alkali metals, alkaline earth metals, and ammonium cations are the most desirable soluble salts in the electrolyte. The electrolyte may be prepared by dissolving the salt in water in a concentration between about 30 grams per liter and that producing a saturated solution at ordinary temperatures. The concentration does not appear to be critical, although for best results certain concentrations are to be preferred depending upon the particular salt or combination of salts that are to be used. For example, preferred concentrations of the alkaline earth metal bromides (hydrated) are from about 150 to 600 grams, preferably 500 grams of the hydrated salt per liter of water. While a single salt may be used as the electrolyte, combinations of salts, particularly combinations of alkali metal bromides with alkaline earth metal bromides are desirable. Examples of soluble salts that may be added to the electrolyte are lithium bromide, sodium bromide, magnesium bromide, magnesium chloride, strontium bromide, calcium bromide and ammonium bromide.

It is also desirable to include in the electrolyte one or more alkali metal, alkaline earth metal (including magnesium), or ammonium salts of chromic acid in corrosion-inhibiting amounts. The chromic acid salts may be used in proportions between 0.01 gram per liter of solution to concentrations producing saturation in the presence of the electrolyte salt obtained therein. A preferred concentration of hydrated lithium chromate is about 0.05 to 2.0 grams per liter of solution. Examples of corrosion-inhibiting salts are sodium chromate, ammonium chromate, potassium dichromate, lithium dichromate, magnesium chromate, and calcium chromate.

For certain applications, principally where a long shelf life is required, it is desirable to omit one of the essential components until the need for electrical energy has arisen. The primary cells of the invention are particularly adaptable to be prepared as reserve cells, for example, but omitting the electrolyte until just prior to use.

*The cathode.*—According to the invention, the cathode includes an organic oxidizing substance in which the oxidizing properties of said substance are due at least in part to nitro groups chemically combined in said substance. These substances are also referred to as nitro organic compounds. During the electro-chemical action, the substance undergoes a reduction as the primary cell furnishes electric current. The nitro organic compounds which are insoluble in conventional electrolytes are particularly suitable for use as cathode materials in dry cells. Some of these insoluble nitro organic compounds are liquids which are immiscible in the electrolyte and can be adsorbed by materials such as acetylene black or graphite. Nitro organic compounds soluble in the cell electrolyte may be used in reserve cells.

The following list gives examples of nitro organic compounds which are useful in the primary cells of the invention.

Benzene compounds having one nitro group per ring:
    Nitrobenzene
    p-Nitroaniline
    m-Nitrobenzoic acid
    p-Nitrobenzoic acid
    1,3-dimethyl-2-nitrobenzene
    Nitromesitylene
    4-nitrobiphenyl
    p-Nitrobenzene sulfonic acid
    Nitroterephthalic acid
    p-Nitrobenzenesulfonylchloride
    p-Nitrotoluene
    p-Nitrobenzonitrile
    p-Nitrophenol
    Fluoro-4-nitrobenzene
    o-Nitrobenzenearsonic acid
    Ethyl-p-nitrobenzoate
    p-Nitrobenzaldehyde
    p-Nitrobenzamide
    p-Nitrophenol sodium salt
    3-nitrophthalimide
    Bis-(p-nitrophenyl) disulfide
    4,4'-dinitrobiphenyl
    1,5-bis-(m-nitrophenyl)-3-pentadienenone
    1,5-bis-(p-nitrophenyl) carbohydrazide
    p-Nitrobenzenazoresorcinol
    1-bromo-4-nitrobenzene
    2-nitrodiphenylamine
    m-Nitrobenzenesulfonic acid
    m-Nitrobenzenesulfonic acid Na salt
    2,3,5,6-tetrachloronitrobenzene
    2,4-dichloronitrobenzene
    1-chloro-4-nitrobenzene
    m-Nitroaniline
    5-nitroisatin
    5-chloro-2-nitrobenzaldehyde
    2,5-dichloronitrobenzene
    m-Nitrobenzaldehyde
    m-Nitrotoluene
    m-Nitrobenzonitrile
    m-Nitrophenol
    p-Nitrobenzhydrazide
    p-Nitrophenylisocyanate Benzene compounds having two nitro groups per ring:
    3,5-dinitrosalicyclic acid
    3,5-dinitrosalicyclic acid, mono sodium salt
    Dinitromesitylene
    2,4-dinitrochlorobenzene
    2,4-dinitrobromo benzene
    2,5-dinitrophenol
    2,4-dinitrophenylacetic acid
    Bis-(2,4-dinitrophenyl) disulfide
    2,2'-4,4'-tetranitrobiphenyl
    m-Dinitrobenzene
    p-Dinitrobenzene
    2,4-dinitroaniline
    3,5-dinitrobenzoic acid
    3,5-dinitro-2-methyl benzoic acid
    2,5-dinitrobenzoic acid
    2,4-dinitrotoluene
    2,4-dinitrophenylhydrazine
    2,4-dinitrodiphenylamine
    2,4-dinitrobenzenesulfonic acid
    Potassium-2,4-dinitrobenzenesulfonate
    2,6-dinitrohydroquinone-4-monoacetate
    3,5-dinitrobenzyl chloride
    2,4-dinitrobenzenesulfonyl chloride
    2,4-dinitroanisole
    4,6-dinitro-o-cresol sodium salt
    4-chloro-2,6-dinitroaniline
    2,4-dinitrophenetole
    4,6-dinitro-o-cresol
    2,4-dinitrophenol
    2,6-dinitrothymol
    2-bromo-4,6-dinitroaniline
    2,3-dinitroacetanilide
    3,4-dinitroacetanilide
    2,5-dinitroacetanilide
    1,4-dichloro-2,6-dinitrobenzene
    Molecular complex of 1,4-dichloro-2,6-dinitrobenzene and 1,4-dichloro-2,5-dinitrobenzene
    o-Dinitrobenzene
    3,4-dinitrobenzoic acid
    3,5-dinitrobenzamide
    3,5-dinitrobenzonitrile
    2,4-dinitrobenzaldehyde
    Ethyl bis (2,4-dinitrophenyl) acetate
    Bis (2,4-dinitroterephthalanilide
    2,6-dinitrotoluene
    2,5-dinitrotoluene
    2,3-dinitrotoluene
    4-amino-3,5-dinitrophenylphosphoric acid
    3,4-dinitrotoluene
    4-chloro-3,5-dinitrobenzenesulfonic acid, K-salt 2,4-dinitrobenzylchloride
2,4-dinitrophenylsemicarbazide
3,5-dinitrotoluene
2,4-dinitrofluorobenzene
4-chloro-2,6-dinitrophenol
Ethyl 3,5-dinitrobenzene
Ethyl ester of 3,5-dinitrobenzoic acid
4-chloro-3,5-dinitrobenzene sulfonic acid K salt
Methyl-2-chloro-3,5-dinitrobenzoate
2,4,7-trinitrofluorenone
Benzene compounds having three nitro groups per ring:
    2,4,6 trinitroaniline
    5-tert-butyl-2,4,6-trinitro-m-xylene
Polynuclear aromatic compounds:
    2,4-dinitro-1-naphthol-7-sulfonic acid
    2,4-dinitro-1-naphthol
    1-nitronaphthalene
Quinone compounds:
    2-nitrophenanthraquinone
    5-nitro-1-anthraquinone sulfonic acid
    Nitroalizarine
Nitroso compounds: Meta nitrosonitrobenzene
Benzimidazoles: 6-nitrobenzimidazole
Indazoles: 5-nitroindazole
Quinolines:
    5-nitroisoquinoline
    6-nitroquinoline
    8-nitroquinoline
Thiophene derivatives: 2-nitrothiophene
Triazole derivatives: 5-nitrobenzotriazole
Furan derivatives:
    5-nitro-2-furanmethanodioldiacetate
    2-nitrofuran
    2-methyl-5-nitrofuran
    2,5-dinitrofuran
Pyridone derivatives: 3-cyano-5-nitro-2-pyridone
Pyridine derivatives: Ethyl-2-methyl-5-nitronicotinate
Amidines of carbonic acid: Nitroguanidine
Cyclic ureides:
    5-nitrobarbituric acid
    5-nitrouracil
Alkane derivatives:
    Nitroethane
    2-nitropropane
    1-nitropropane
    2,2-dinitropropane
    1-chloro-1-nitropropane
    2-nitro-2-nitrosopropane
    Dinitroneopentane
    2,3-dinitro-2,3-dimethylbutane
    Trichloronitromethane
    1,1-dichloro-1-nitroethane
    2-nitrobutane
    2-methyl-2-nitropropane
    3-chloro-1-nitropropane
    1-nitrobutane
    2-chloro-1-nitropropane
    Tetranitromethane
    2,4,6-trinitro-2,6-dichloroheptane
    2,4,6-trinitro-2,4,6-trichloroheptane
Aliphatic alcohols:
    2-nitro-2-ethyl-1,3-propanediol
    2-nitro-1-butanol
Aliphatic acid derivatives: 4-bromo-4,4-dinitrobutyric acid
Aliphatic ester derivatives:
    Dimethyl-5,5-dinitro-2,8-diaza-1,9-nonanedioate
    Dimethyl-4,4-dinitro-1,7-heptanedioate
    2-nitroisobutylphosphate
    2-nitroisobutylacetate
    2-chloro-2-nitropropyl esters of dicarboxylic acids from carbonic up to sebacic acid
Aliphatic ketone derivatives: 2-nitro-1,3-indanedione
Aliphatic aldehyde derivatives: Sodium nitromalonaldehyde
Combinations of aromatic and aliphatic compounds: 2-chloro-2-nitropropyl esters of dicarboxylic acids from carbonic up to sebacic acid Any organic compound, having a nitro group is useful in the cathodes of the primary cells of the invention. The primary cells of the invention all utilize the electron change obtained in converting a nitrogen atom with a valence of plus 3 in a nitro group to a nitrogen atom with a valence of minus 3 as in an amine group. This is shown schematically by the following equation:

$$N^{+3} + 6e^- \rightarrow N^{-3}$$

In addition to a nitro group, the nitro organic compounds may have other groups in their structure, for example, the following groups may be included:

—$CONH_2$, —$SO_3H$, —CHO, —$CO_2H$, —$CO_2R$, —X,
—COR, —$COCO_2H$, —CN, —$CX_3$, —$NH_3^+$, —$NR_3^+$,
—OH, —OR, —OAc, —NO, —$NH_2$, —NHR, —$NR_2$,
NHAc, —N=N—, —$CH_3$, —$CH_2SO_3H$, —$CH_2CO_2H$,
—$CH_2NH_2$, —$CH_2CN$, —$CH_2CH_2CO_2H$,
—CH=$CHCO_2H$, —CH=$CHNO_2$, —C=$CCO_2H$,
—$C_6H_5$, Na, K where R represents an alkyl radical, Ar represents an aromatic radical and X represents a halogen.

A nitro organic compound may include more than one nitro group in its structure. Although all nitro organic compounds may be used in primary cells of the invention, some of the more complex compounds having more than two nitro groups are unstable and, as a practical matter, would not be employed in their unstable state. In addition, various of the foregoing groups may be combined in a nitro organic compound to vary its potential, solubility, stability and capacity. For example, when meta-directing groups, such as —$NO_2$, —$SO_3H$, —COOH, are combined in compounds including a benzene ring, then primary cells employing such compounds as cathode materials have a higher operating voltage. As another example, when a nitro organic acid compound is esterified, its solubility is decreased. The cathodes of the primary cells of the invention may also comprise a mixture of one or more nitro organic compounds, or a mixture with one or more other organic oxidizing compounds, such as nitroso organic compounds, or with inorganic cathode materials such as manganese dioxide or the like.

For many situations, it is desirable to increase the electrical conductivity of the cathode. One may add varying proportions of non-reactive conductive materials to obtain the desired electrical conductivity. Carbon is a preferred material for this purpose because of its low cost and easy availability. Any of the various forms of carbon, such as graphite, or acetylene black may be used. The conducting material may comprise up to 80% by weight of the cathode mix.

The cathodes of the invention may be fabricated by a number of methods and in various shapes. Example 1 describes preparing a mixture of powders with electrolyte and then pressing a quantity of the mixture to the desired shape and density. Another cathode mix may include a binder such as polyvinyl alcohol, carboxymethylcellulose, methylcellulose, a vinyl resin, bentonite or silica gel. Such mix may be pressed as described above, or cast in a mold to fabricate the cathode. The binder adds strength and rigidity to the cathode especially where odd shapes are used. A cathode mix containing a binder may be coated on a suitable support such as a carbon rod or block and used in layer form. Besides simple coatings, films containing the cathode mix may also be prepared by the addition of a film-forming material to the cathode mix and using techniques well-known in the plastics art. One technique is to coat paper separator sheets with magnesium powder in a binder on one surface and the cathode mix in a binder on the other surface. The coated sheets may then be stacked and stamped to produce batteries of the desired voltage and geometry.

In some cases, it is desirable to increase the amount of active surface on the cathode. One method for increasing the active surface is to add a proportion of a soluble material, such as sodium chloride, to the cathode mix before fabrication. Upon fabrication, the soluble material is dissolved out of the cathode leaving a somewhat porous structure with a greatly increased proportion of active surface.

The presence of atmospheric oxygen enhances the capacity of the cathodes of cells of various kinds. For example, capacity increases can be realized in the cell of Example 1 by providing a small vent (e.g. 0.05" in diameter) in the wax layer 22, or by preparing a tab on the washer 20 which tab extends up through the wax layer 22. The maximum effect is ordinarily obtained when the drain is relatively light.

It is noteworthy that the materials used to fabricate the cells of the invention may all be produced in the United States by processes well known in the chemical arts. Magnesium may be produced from sea water which is in abundant supply in the United States. The nitro organic compounds may be produced synthetically and many such substances, such as m-dinitrobenzene, are commercially available at the present time. Graphite and acetylene black are also available from sources within the United States.

*Example 2.*—Another dry cell of the invention may be prepared according to Example 1 except that the cathode mix is prepared with the following formulation:

30 grams p-dinitrobenzene
15 grams acetylene black
1.35 grams $BaCrO_4$
48 ml. aqueous solution containing 500 grams $MgBr_2 \cdot 6H_2O$ and 1.0 gram $Li_2CrO_4 \cdot 2H_2O$ per liter of water Referring to Figure 6, curves 51 and 51a show the characteristic cell voltage of the cell of Example 2 when discharged continuously through 150 ohm and 300 ohm resistances respectively. Curves 53 and 53a show cell voltages for similar zinc/p-dinitrobenzene primary cells under the same conditions of discharge. Curves 55 and 55a show cell voltages for a similar commercially-available zinc/manganese dioxide primary cell under the same conditions of discharge. The cell of Example 2 exhibits longer periods of service to a 0.90 volt cutoff than the other cells.

*Example 3.*—Another dry cell of the invention may be prepared according to Example 1 except that the cathode mix is prepared with the following formulation:

100 grams potassium-2,4-dinitrobenzene sulfonate
12.5 grams acetylene black
3.4 grams barium chromate
70 cc. of an aqueous solution containing 250 grams $MgBr_2 \cdot 6H_2O$ per liter of water A potassium-2,4-dinitrobenzene sulfonate cathode has a theoretical capacity of 67.0 ampere-minutes per gram which is greater than most other cathode materials presently employed in certain types of cells comparable to the cell described above. For example, manganese dioxide has a theoretical capacity of 18.5 and mercuric oxide has a theoretical capacity of 14.9 ampere-minutes per gram.

Figure 7 shows characteristic discharge curves for some "AA" size magnesium/nitro organic compound cells compared with the published characteristic curve of a commercial zinc/manganese dioxide when discharged continuously through a 50 ohm resistance (simulating a transistor operated portable radio application). Curve 63 is for a magnesium/potassium-2,4-dinitrobenzene sulfonate cell; curve 61 is for a similar magnesium/2,4-dinitroaniline cell; and curve 65 is for a zinc/manganese dioxide cell. The cells of the present invention maintain a favorable voltage level for a longer period of time than the zinc/manganese dioxide cell.

The magnesium/potassium-dinitrobenzene sulfonate cell, curve 63 maintains a more constant voltage level than the zinc/manganese dioxide cell over a longer period of time. The nitro organic materials are less dense than the materials employed in the zinc/manganese dioxide cell and when the foregoing cells are compared on the basis of milliwatt hours per gram to a 0.9 volt cutoff the zinc/manganese dioxide cell is rated at about 33, the potassium-2,4-dinitrobenzene sulfonate is rated at about 56 and the 2,4-dinitroaniline is rated at 51 milliwatt hours per gram.

*Example 4.*—Another dry cell may be prepared according to Example 1 except that the cathode mix is prepared according to the following formulation:

100 grams 3,5-dinitrobenzamide
50 grams acetylene black
9 grams barium chromate
200 ml. aqueous solution containing 500 grams $MgBr_2 \cdot 6H_2O$ and 1.0 gram $Li_2CrO_4 \cdot 2H_2O$ per liter of water The characteristic discharge curve of the cell when discharged continuously through a 50 ohm resistance is illustrated in Figure 8, curve 71.

*Example 5.*—Another dry cell may be prepared according to Example 1 except that the cathode mix is prepared according to the following formulation:

100 grams p-dinitrobenzene
50 grams acetylene black
9 grams barium chromate
200 ml. aqueous solution containing 500 grams $MgBr_2 \cdot 6H_2O$ and 1.0 gram $Li_2CrO_4 \cdot 2H_2O$ per liter of water.

The characteristic discharge curve of the cell when discharged continuously through a 50 ohm resistance is illustrated in Figure 8, curve 73.

*Example 6.*—Another dry cell may be prepared according to Example 1 except that the cathode mix is prepared according to the following formulation:

40 grams 1-chloro-2,4-dinitrobenzene
80 grams Darco G–60 carbon black
3.6 grams barium chromate
135 ml. aqueous solution containing 500 grams $MgBr_2 \cdot 6H_2O$ and 1.0 gram $Li_2CrO_4 \cdot 2H_2O$ per liter of water The characteristic discharge curve of the cell when discharged continuously through a 50 ohm resistance is illustrated in Figure 8, curve 75.

*Example 7.*—Another dry cell may be prepared according to Example 1 except that the cathode mix is prepared according to the following formulation:

40 grams 2,4-dinitrotoluene
80 grams Darco G–60 carbon black
3.6 grams barium chromate
130 ml. aqueous solution containing 500 grams $MgBr_2 \cdot 6H_2O$ and 1.0 gram $LiCrO_4 \cdot 2H_2O$ per liter of water The characteristic discharge curve of the cell when discharged continuously through a 50 ohm resistance is illustrated in Figure 8, curve 77.

*Example 8.*—Another dry cell may be prepared according to Example 1 except that the anode has the composition designated AZ31X in Table I and the cathode mix is prepared according to the following formulation:

29 grams m-dinitrobenzene
58 grams Darco G–60 carbon black
2.6 grams barium chromate
135 ml. aqueous solution containing 500 grams $MgBr_2 \cdot 6H_2O$ and 1.0 gram $Li_2CrO_4 \cdot 2H_2O$ per liter of water The characteristic discharge curve of the cell when discharged continuously through a 50 ohm resistance is illustrated in Figure 8, curve 79.

*Example 9.*—Another dry cell may be prepared according to Example 1 except that the cathode mix is prepared according to the following formulation:

23 grams dinitrobenzene drainings (containing 30-50% of ortho and para isomers and 70-50% of meta isomer 1050-6, F.P. 68.1° C. TLA-557 obtained from Organic Chemicals Dept. E. I. du Pont de Nemours, Wilmington, Delaware)
46 grams Darco G-60 carbon black
2 grams barium chromate
75 ml. aqueous solution containing 500 grams $MgBr_2 \cdot 6H_2O$ and 1.0 gram $Li_2CrO_4 \cdot 2H_2O$ per liter of water The characteristic discharge curve of the cell when discharged continuously through a 50 ohm resistance is illustrated in Figure 9, curve 81.

*Example 10.*—Another dry cell may be prepared according to Example 1 except that the cathode mix is prepared according to the following formulation:

36 grams m-nitronitrosobenzene
72 grams Darco G-60 carbon black
6.5 grams barium chromate
110 ml. aqueous solution containing 500 grams $MgBr_2 \cdot 6H_2O$ and 1.0 gram $Li_2CrO_4 \cdot 2H_2O$ per liter of water The characteristic discharge curve of the cell when discharged continuously through a 50 ohm resistance is illustrated in Figure 9, curve 83.

*Example 11.*—Another dry cell may be prepared according to Example 1 except that the cathode mix is prepared according to the following formulation:

50 grams o-dinitrobenzene
2.5 grams acetylene black
2.25 grams barium chromate
85 ml. aqueous solution containing 500 grams $MgBr_2 \cdot 6H_2O$ and 1.0 gram $Li_2CrO_4 \cdot 2H_2O$ per liter of water The characteristic discharge curve of the cell when discharged continuously through a 50 ohm resistance is illustrated in Figure 9, curve 85.

*Example 12.*—Another dry cell may be prepared according to Example 1 except that the cathode mix is prepared according to the following formulation:

70 grams 6,8-dinitro-2,4-(1H,3H) quinazolinedione
35 grams acetylene black
3.2 grams barium chromate
112 ml. aqueous solution containing 500 grams $MgBr_2 \cdot 6H_2O$ and 1.0 gram $Li_2CrO_4 \cdot 2H_2O$ per liter of water The characteristic discharge curve of the cell when discharged continuously through a 50 ohm resistance is illustrated in Figure 9, curve 87.

*Example 13.*—Another dry cell may be prepared according to Example 1 except that the cathode mix is prepared according to the following formulation:

30 grams 4-bromo-4,4-dinitrobutyric acid
20 grams Cabot experimental black marketed by Godfrey L. Cabot, Inc., Boston 10, Mass.
90 ml. aqueous solution containing 500 grams $MgBr_2 \cdot 6H_2O$ and 1.0 gram $Li_2CrO_4 \cdot 2H_2O$ per liter of water

*Example 14.*—Another dry cell may be prepared according to Example 1 except that the cathode mix is prepared according to the following formulation:

10 grams m-dinitrobenzene
1.5 grams p-nitrosodimethylaniline
20 grams Darco G-60 carbon black
0.95 grams barium chromate
33.5 ml. aqueous solution containing 500 grams $MgBr_2 \cdot 6H_2O$ and 1.0 gram $Li_2CrO_4 \cdot 2H_2O$ per liter of water

*Example 15.*—Another dry cell may be prepared according to Example 1 except that the cathode mix is prepared according to the following formulation:

40 grams potassium-2,4-dinitrobenzene sulfonate
40 grams manganese dioxide
80 grams Darco G-60 carbon black
4.8 grams barium chromate
155 ml. aqueous solution containing 500 grams $MgBr_2 \cdot 6H_2O$ and 1.0 gram $Li_2CrO_4 \cdot 2H_2O$ per liter

*Example 16.*—A flat reserve cell may be prepared by first mixing the following formulation:

20 grams trinitrobenzene
10 grams acetylene black
40 ml. solution containing 5% by weight of cellulose acetate in acetone Paste a quantity of the cathode formulation to a graphite plate about 1.25" x 1.00" x 0.0625" thick and weighing about 2.0 grams. The cathode assembly is dried, wrapped with a piece of salt-free kraft paper, and then wrapped with a piece of magnesium sheet about 3.0" x 1.0" x 0.010" thick and weighing about 1.0 gram. When it is desired to use the cell, the entire assembly is immersed in an aqueous solution containing 500 grams $MgBr_2 \cdot 6H_2O$ and 1.0 gram $Li_2CrO_4 \cdot 2H_2O$ per liter of water.

There have been described improved primary cells which are inexpensive to manufacture and exhibit a high watt-hour and ampere-hour capacity per unit of volume or weight and a high flat operating voltage level over a wide range of current drains. The cells of the invention use materials which may be produced within the United States in large quantities by techniques well known in the chemical art.

What is claimed is:

1. In a primary cell utilizing the electron change obtained in converting a nitrogen atom with a valence of plus 3 to a valence of minus 3, an anode selected from the group consisting of magnesium and magnesium base alloys, in combination with a cathode including a depolarizer consisting of an organic oxidizing compound in which the oxidizing properties of said substance are due at least in part to nitro groups chemically combined in said compound, said compound being selected from the group consisting of benzene compounds having one nitro group per ring, benzene compounds having two nitro groups per ring, benzene compounds having three nitro groups per ring, polynuclear aromatic compounds, benzimidazoles, indazoles, quinolines, furan derivatives, pyridine derivatives, amidines of carbonic acid, cyclic ureides, alkane derivatives, aliphatic alcohols, aliphatic acid derivatives, aliphatic ester derivatives, aliphatic ketone derivatives, and aliphatic aldehyde derivatives.

2. A primary cell according to claim 1 wherein said anode comprises a magnesium base alloy.

3. A primary cell according to claim 1 wherein said cathode comprises a mixture of different organic oxidizing compounds in which the oxidizing properties of at least one of said substances are due at least in part to nitro groups chemically combined in said compounds.

4. A primary cell according to claim 1 wherein said cathode includes an inorganic depolarizer.

5. A primary cell according to claim 1 wherein said cathode includes an inorganic material for increasing the electrical conductivity of said cathode.

6. A primary cell utilizing the electron change obtained in converting a nitrogen atom with a valence of plus 3 to a valence of minus 3, said cell comprising a magnesium anode, an electrolyte, and a cathode including a depolarizer consisting of an organic oxidizing compound in which the oxidizing properties are due at least in part to nitro groups chemically combined with said compound, said compound being selected from the group consisting of benzene compounds having one nitro group per ring, benzene compounds having two nitro groups per ring, benzene compounds having three nitro groups per ring, polynuclear aromatic compounds, benzimidazoles, indazoles, quinolines, furan derivatives, pyridine derivatives, amidines of carbonic acid, cyclic ureides, alkane derivatives, aliphatic alcohols, aliphatic acid derivatives, aliphatic ester derivatives, aliphatic ketone derivatives, and aliphatic aldehyde derivatives.

7. A primary cell according to claim 6 wherein said electrolyte is an aqueous solution having dissolved therein a compound selected from the group consisting of alkali metal bromides, alkaline earth metal bromides, and ammonium bromides.

8. A primary cell according to claim 6 wherein said electrolyte is an aqueous solution having dissolved therein a chromic acid salt of an anion selected from the group consisting of alkali bases, alkaline earth metal bases and ammonium bases.

9. A primary cell utilizing the electron change obtained in converting a nitrogen atom with a valence of plus 3 to a valence of minus 3, said cell comprising a magnesium base alloy anode, an aqueous electrolyte having dissolved therein magnesium bromide and a chromate inhibitor, and a cathode comprising carbon and an organic oxidizing compound in which the oxidizing properties are due at least in part to nitro groups chemically combined in said compound, said compound being selected from the group consisting of benzene compounds having one nitro group per ring, benzene compounds having two nitro groups per ring, benzene compounds having three nitro groups per ring, polynuclear aromatic compounds, benzimidazoles, indazoles, quinolines, furan derivatives, pyridine derivatives, amidines of carbonic acid, cyclic ureides, alkane derivatives, aliphatic alcohols, aliphatic acid derivatives, aliphatic ester derivatives, aliphatic ketone derivatives, and aliphatic aldehyde derivatives.

10. A primary cell including a magnesium anode, an aqueous electrolyte, and a cathode including meta-dinitrobenzene.

11. A primary cell including a magnesium anode consisting essentially of an aqueous electrolyte and a cathode including 3,5-dinitrobenzamide.

12. A primary cell including a magnesium anode, an aqueous electrolyte, and a cathode including 1-chloro-2,4-dinitrobenzene.

13. A primary cell including a magnesium anode base alloy, an aqueous electrolyte, and a cathode including 2,4,6-trinitro-2,4,6-trichloroheptane.

14. A primary cell including a magnesium anode, an aqueous electrolyte and a cathode including tetranitromethane.

15. A reserve cell utilizing the electron change obtained in converting a nitrogen atom with a valence of plus 3 to a valence of minus 3, said cell adapted to be used upon the addition of an electrolyte, said cell comprising a magnesium anode and, associated therewith, a cathode comprising a depolarizer consisting of an organic oxidizing compound in which the oxidizing properties are due at least in part to nitro groups chemically combined in said compound, said compound being selected from the group consisting of benzene compounds having one nitro group per ring, benzene compounds having two nitro groups per ring, benzene compounds having three nitro groups per ring, polynuclear aromatic compounds, benzimidazoles, indazoles, quinolines, furan derivatives, pyridine derivatives, amidines of carbonic acid, cyclic ureides, alkane derivatives, aliphatic alcohols, aliphatic acid derivatives, aliphatic ester derivatives, aliphatic ketone derivatives, and aliphatic aldehyde derivatives.

References Cited in the file of this patent

UNITED STATES PATENTS

| | | |
|---|---|---|
| 1,134,093 | Bauer | Apr. 6, 1915 |
| 2,306,927 | Arsem | Dec. 29, 1942 |
| 2,343,194 | Lawson | Feb. 29, 1944 |
| 2,612,533 | Blake | Sept. 30, 1952 |

UNITED STATES PATENT OFFICE
CERTIFICATE OF CORRECTION

Patent No. 2,880,122                         March 31, 1959

Clarence K. Morehouse et al.

It is hereby certified that error appears in the printed specification of the above numbered patent requiring correction and that the said Letters Patent should read as corrected below.

Column 4, line 45, TABLE 1, under the heading "Al", for "0.9" read -- 9.0 --; column 6, lines 25 and 26, for "-dinitrosalicyclic", each occurrence, read -- -dinitrosalicylic --; column 8, line 19, for "NHAc," read -- -NHAc, --.

Signed and sealed this 28th day of July 1959.

(SEAL)

Attest:

KARL H. AXLINE                                 ROBERT C. WATSON
Attesting Officer                               Commissioner of Patents